(12) United States Patent
Koonath et al.

(10) Patent No.: US 12,140,712 B2
(45) Date of Patent: Nov. 12, 2024

(54) INCREASING SIGNAL-TO-NOISE RATIOS IN LIDAR SYSTEMS

(71) Applicant: SiLC Technologies, Inc., Monrovia, CA (US)

(72) Inventors: Prakash Koonath, La Crescenta, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 566 days.

(21) Appl. No.: 17/067,623

(22) Filed: Oct. 9, 2020

(65) Prior Publication Data
US 2022/0113390 A1   Apr. 14, 2022

(51) Int. Cl.
*G01S 7/481* (2006.01)
*G01S 7/495* (2006.01)
*G01S 7/499* (2006.01)

(52) U.S. Cl.
CPC ............ *G01S 7/495* (2013.01); *G01S 7/4817* (2013.01); *G01S 7/499* (2013.01)

(58) Field of Classification Search
CPC ........ G01S 7/495; G01S 7/499; G01S 7/4817; G01S 7/4812; G01S 7/4814; G01S 7/4816; G01S 7/4818; G01S 7/493; G01S 17/34; G01S 17/42; G01S 17/58; G01S 7/497
USPC ....................................................... 356/4.01
See application file for complete search history.

(56) References Cited

U.S. PATENT DOCUMENTS

| 2015/0055115 A1 | 2/2015 | Pedersen et al. |
| 2016/0209594 A1 | 7/2016 | Bahl |
| 2018/0372517 A1 | 12/2018 | Yao et al. |
| 2020/0256956 A1 | 8/2020 | Luff et al. |
| 2020/0284883 A1 | 9/2020 | Ferreira et al. |

FOREIGN PATENT DOCUMENTS

| DE | 10 2017 200795 A1 | 7/2018 |
| GB | 1 585 053 A | 2/1981 |

OTHER PUBLICATIONS

Baharlou, Simin, International Preliminary Report on Patentability and Written Opinon, PCT/US2021/053670, The International Bureau of WIPO, Apr. 20, 2023.
Rodriquez, Kari, International Search Report and Written Opinon, PCT/US2021/053670, International Searching Authority, United States Patent and Trademark Office, Dec. 29, 2021.
Kirscher, Jerome, Search Report, Application No. 21878414.8, European Patent Office, Sep. 24, 2024.

*Primary Examiner* — Daniel L Murphy
(74) *Attorney, Agent, or Firm* — Gavrilovich, Dodd & Lindsay LLP

(57) ABSTRACT

A LIDAR system includes a light source configured to output light. A portion of the light is included in a LIDAR signal that travels a LIDAR path from the light source to an object located outside of the LIDAR system and from the object to a filter and from the filter to a processing unit. The processing unit is configured to convert optical signals that include the LIDAR signal to electrical signals. A portion of the light is also included in one or more misdirected signals. Each of the misdirected signals travels a different misdirected path from the light source to the filter. Each of the misdirected paths is a different path from the LIDAR path. The system also includes a filter being configured to filter (Continued)

out the LIDAR signal from the misdirected signals. The system also includes electronics that generate LIDAR data from the electrical signals.

20 Claims, 8 Drawing Sheets

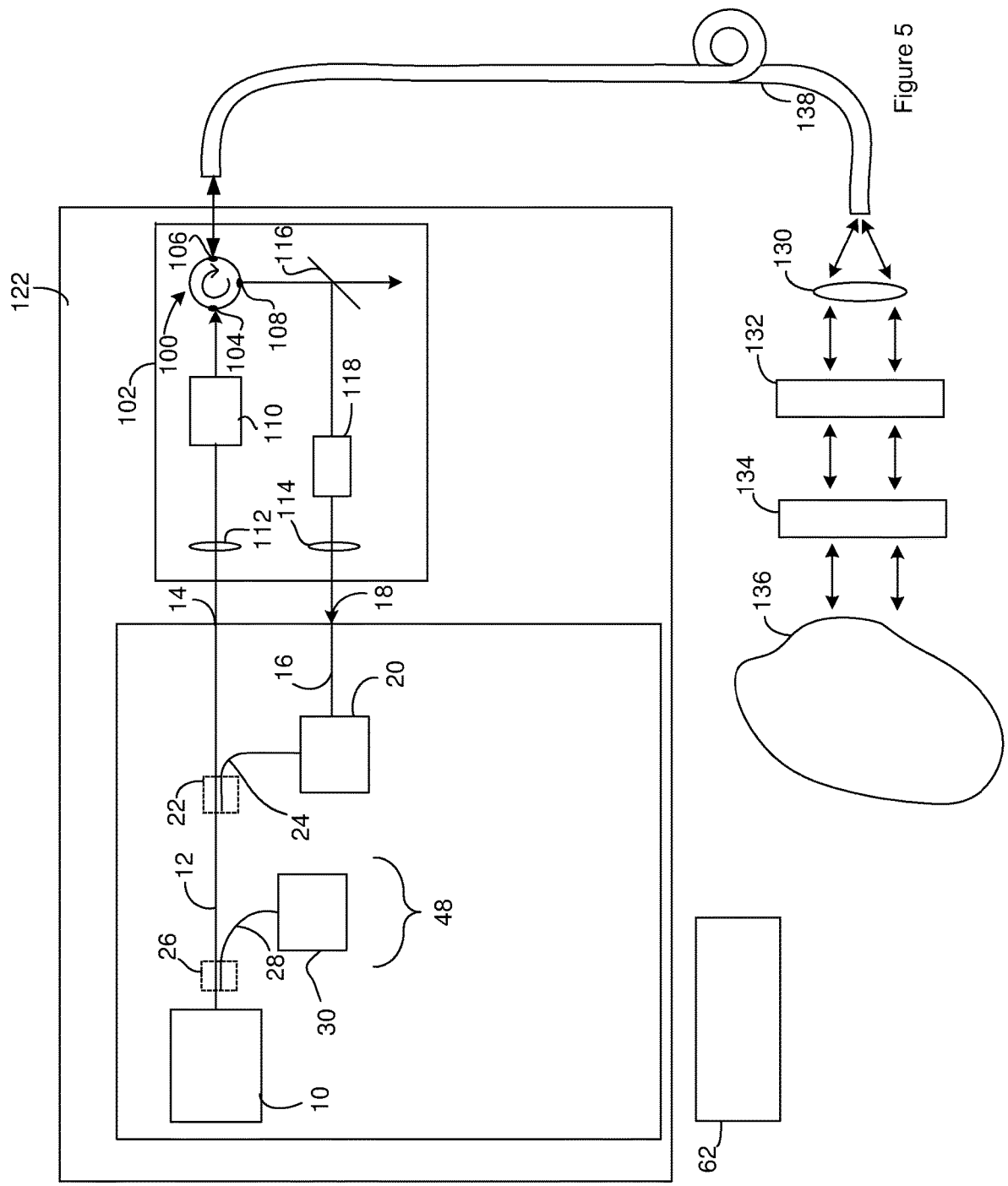

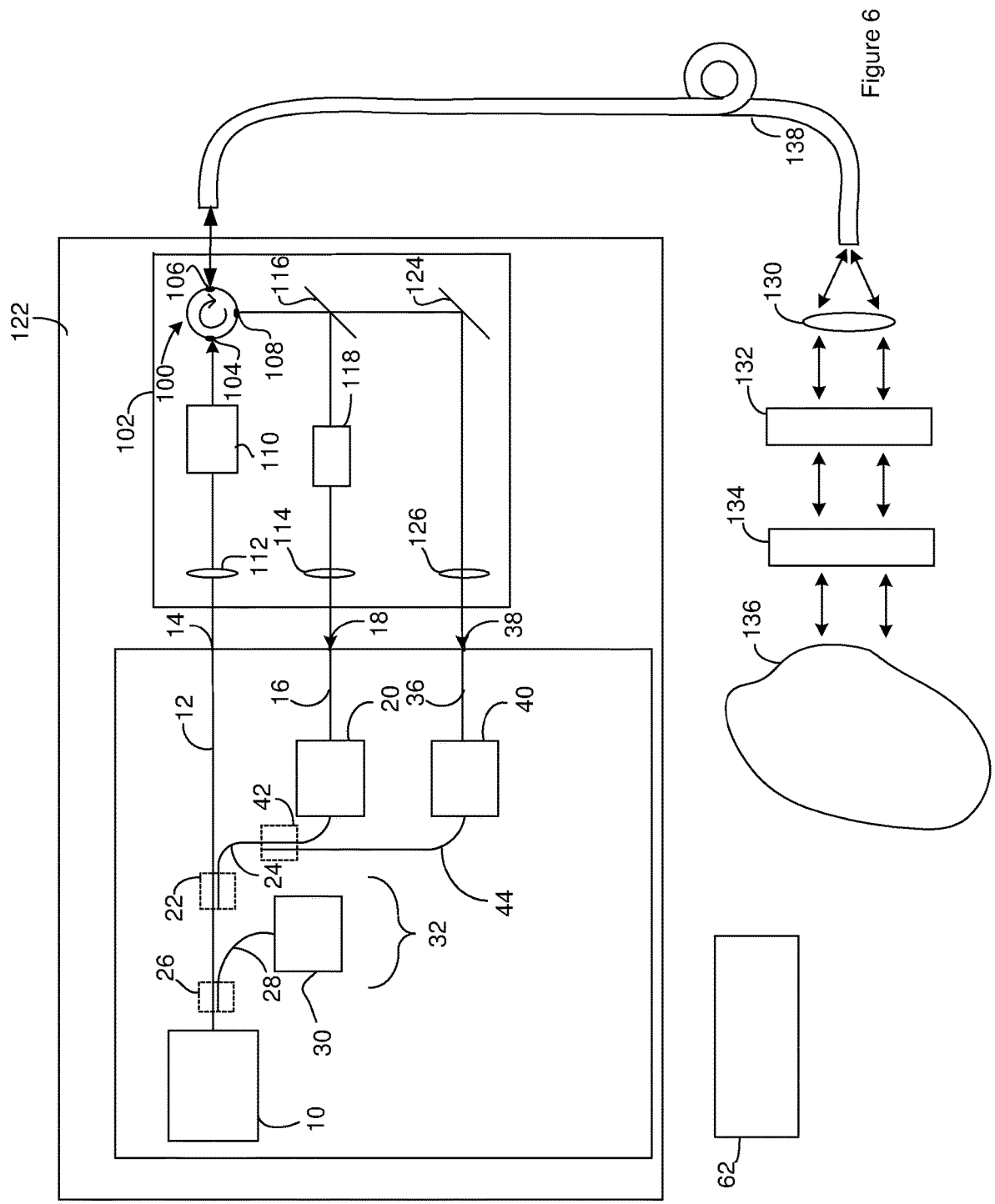

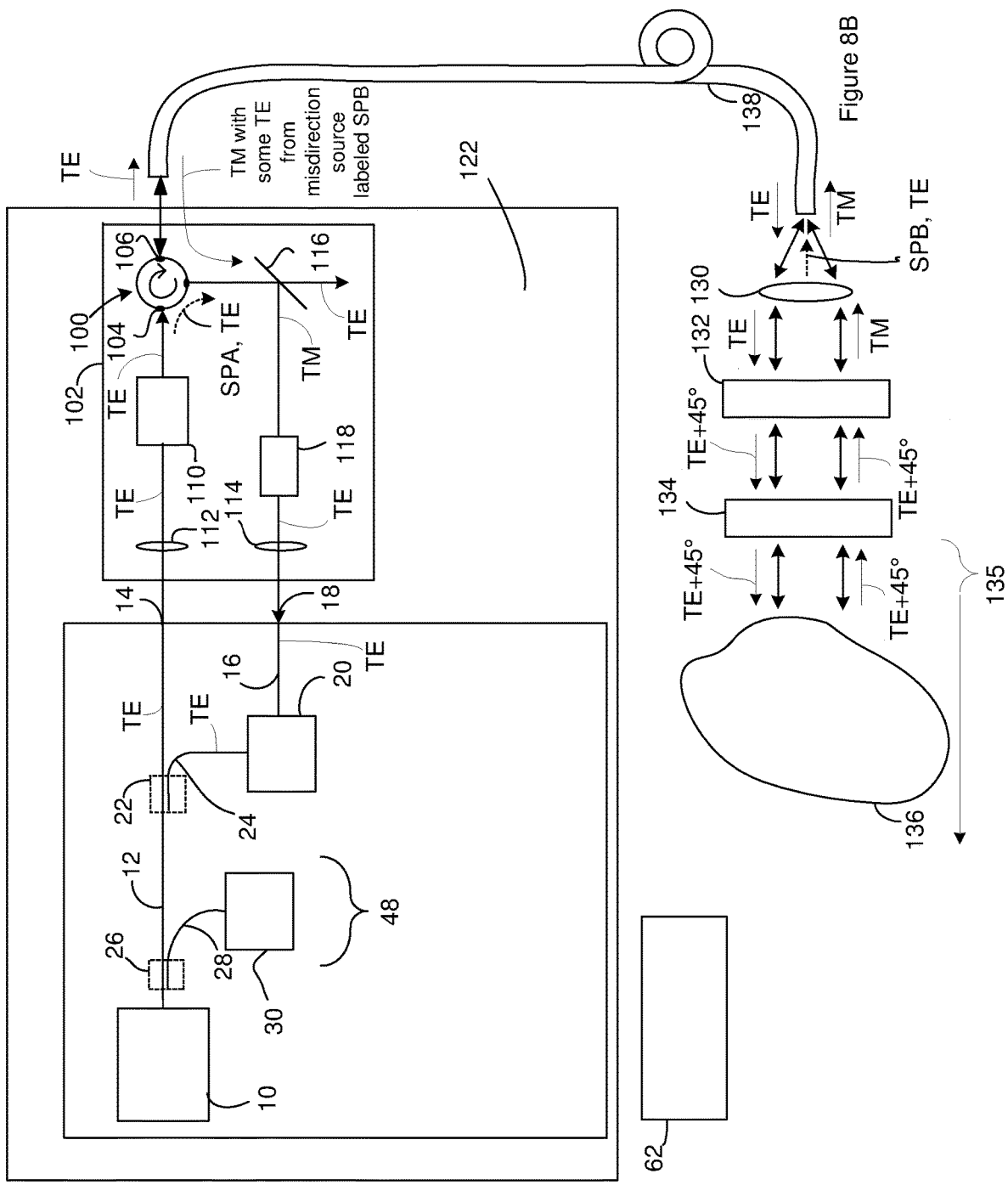

INCREASING SIGNAL-TO-NOISE RATIOS IN LIDAR SYSTEMS

FIELD

The invention relates to optical devices. In particular, the invention relates to LIDAR systems.

BACKGROUND

The performance demands placed on LIDAR systems is increasing as these systems support an increasing number of applications. LIDAR systems generally generate light signals that are used to illuminate one or more sample regions in a field of view. When an object in the sample region reflects the light, the reflected light can return to the LIDAR system. The LIDAR system can use the reflected light to generate LIDAR data for each of the sample regions. The LIDAR data for a sample region indicates the radial velocity and/or distance between the LIDAR system and one or more objects located in the sample region.

The LIDAR system converts the reflected light to electrical signals. Electronics use these electrical signals to generate the LIDAR data. However, the handling of the light signals by the LIDAR system can be a source of noise in the electrical signals. This noise can reduce the reliability of the LIDAR data. As a result, there is a need for an improved LIDAR system.

SUMMARY

A LIDAR system includes a light source configured to output light. A portion of the light is included in a LIDAR signal that travels a LIDAR path from the light source to an object located outside of the LIDAR system and from the object to a filter and from the filter to a processing unit. The processing unit is configured to convert optical signals that include the LIDAR signal to electrical signals. A portion of the light is also included in one or more misdirected signals. Each of the misdirected signals travels a different misdirected path from the light source to the filter. Each of the misdirected paths is a different path from the LIDAR path. The system also includes a filter being configured to filter out the LIDAR signal from the misdirected signals. The system also includes electronics that generate LIDAR data from the electrical signals.

BRIEF DESCRIPTION OF THE FIGURES

FIG. 5 is a topview of a LIDAR system that includes the LIDAR chip of FIG. 1 and the LIDAR adapter of FIG. 3 on a common mount.

FIG. 6 is a topview of a LIDAR system that includes the LIDAR chip of FIG. 2 and the LIDAR adapter of FIG. 4 on a common mount.

FIG. 8B is the LIDAR system of FIG. 5 marked to show examples of possible misdirection sources and polarization states of signals at different locations in the LIDAR system.

DESCRIPTION

A LIDAR system includes a light source configured to output light. A portion of the light is included in a LIDAR signal that travels a LIDAR path from the light source to an object located outside of the LIDAR system and from the object to a filter and from the filter to a processing unit. The processing unit is configured to convert optical signals that include the LIDAR signal to electrical signals. Electronics can generate LIDAR data from the electrical signals. The LIDAR data can indicate the radial velocity and/or distance between the LIDAR system and one or more objects located in a sample region outside of the LIDAR system.

A portion of the light from the light source is also included in one or more misdirected signals. Each of the misdirected signals travels a different path from the light source to a misdirection source and then to the filter. The misdirection sources are each a feature of the LIDAR path that causes one of the misdirected signals to divert from the full length of the LIDAR path. The inventors have found that these misdirected signals can be a source of noise in the electrical signals from which the LIDAR data is generated. The system includes an optical filter configured to filter at least one of the misdirected signals from the LIDAR signal. As a result, the noise in the electrical signals is reduced. This reduction in noise levels increases the reliability of the LIDAR data.

Figure 1:
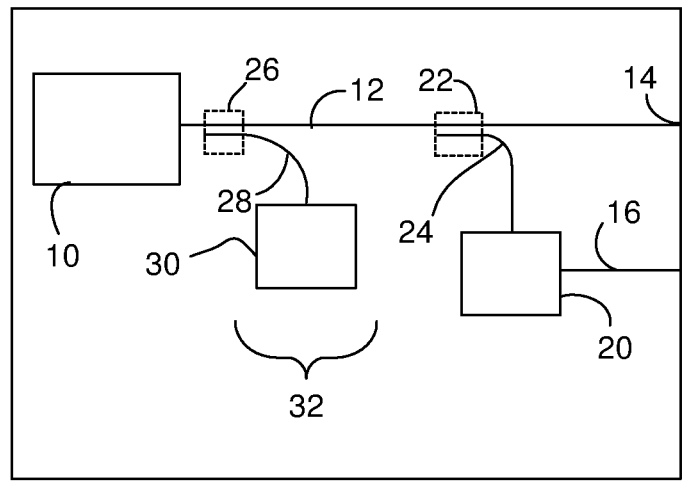
FIG. 1 is a topview of a schematic of a LIDAR chip for use in a LIDAR system.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 10 that outputs a light source signal. A suitable light source 10 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives the light source signal from the light source 10. The utility waveguide 12 includes a splitter 22 that receives the light source signal. The splitter outputs an outgoing LIDAR signal on the utility waveguide 12.

The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system in the system output signal. The system output signal can travel through free space in the atmosphere in which the LIDAR system is positioned. The system output signal may be reflected by one or more objects in the path of the system output signal. When the system output signal is reflected, at least a portion of the reflected light travels back toward the LIDAR chip as a system input signal.

Light from the system return signal can be carried in a first LIDAR input signal that is received by the LIDAR chip. In some instances, a portion of the system return signal can serve as the first LIDAR input signal. The first LIDAR input signals enters a comparative waveguide 16 through the facet 18 and serves as a first comparative signal. The comparative waveguide 16 carries the first comparative signal to a processing unit 20 configured to convert the optical signals to electrical signals from which LIDAR data (the radial velocity and/or distance between the LIDAR system and one or more objects located outside of the LIDAR system) is generated.

The splitter 22 moves a portion of the light source signal from the utility waveguide 12 onto a reference waveguide 24 as a first reference signal. The reference waveguide 24 carries the first reference signal to the processing unit 20 for further processing.

The percentage of light transferred from the utility waveguide 12 by the splitter 22 can be fixed or substantially fixed. For instance, the splitter 22 can be configured such that the power of the first reference signal transferred to the reference waveguide 24 is a percentage of the power of the light source signal. In some instances, the percentage is greater than 5%, 10%, or 20% and/or less than 50%, or 60%. Suitable splitters 22 include, but are not limited to, optical couplers, y-junctions, tapered couplers, and Multi-Mode Interference (MMI) devices.

The LIDAR chip can include a control branch for controlling operation of the light source 10. The control branch includes a splitter 26 that moves a portion of the light source signal from the utility waveguide 12 onto a control waveguide 28. The coupled portion of the light source signal serves as a tapped signal. Although FIG. 1 illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MMI) devices.

The control waveguide 28 carries the tapped signal to control components 30. The control components 30 can be in electrical communication with electronics 32. All or a portion of the control components 30 can be included in the electronics 32. During operation, the electronics can employ output from the control components 32 to control a process variable of one, two, three, four, or five controlled light signals selected from the group consisting of the tapped signal, the outgoing LIDAR signal, the system output signal, and the LIDAR output signal. Examples of the suitable process variables include the frequency of the controlled light signal and/or the phase of the controlled light signal.

Figure 2:
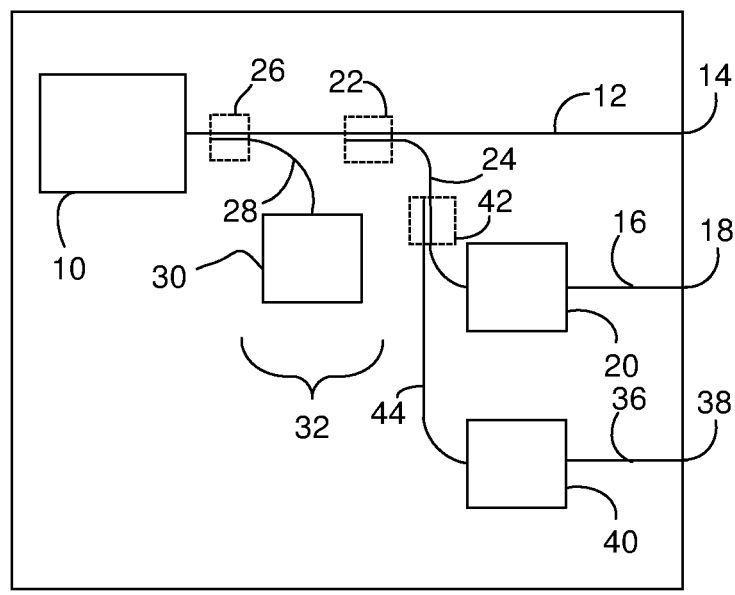
FIG. 2 is a topview of a schematic of another embodiment of a LIDAR chip for use in a LIDAR system.

FIG. 2 is a topview of a schematic of a LIDAR chip that can serve as a LIDAR system or can be included in a LIDAR system that includes components in addition to the LIDAR chip. The LIDAR chip of FIG. 2 illustrates the LIDAR chip of FIG. 1 modified to process multiple LIDAR input signals. As noted above, when the light from the system output signal is reflected by an object located outside of the LIDAR system, at least a portion of the reflected light can travel back toward the LIDAR chip in the system return signal.

Light from the system return signal can be carried in a second system LIDAR input signal that is received by the LIDAR chip. In some instances, a portion of the system return signal can serve as the second LIDAR input signal. The LIDAR chip includes a second comparative waveguide 36 that terminates at a facet 38. The second LIDAR input signals enters the second comparative waveguide 36 through the facet 38 and serves as a second comparative signal. The second comparative waveguide 36 carries the second comparative signal to a second processing unit 40 configured to convert the optical signals to electrical signals from which LIDAR data (the radial velocity and/or distance between the LIDAR system and one or more objects located outside of the LIDAR system) is generated.

The reference waveguide 24 carries the first reference signal to a splitter 42. The splitter 42 moves a portion of the outgoing LIDAR signal from the reference waveguide 24 onto a second reference waveguide 44 as a second reference signal. The second reference waveguide 44 carries the second reference signal to the second processing unit 40 for further processing.

As will be described in more detail below, the first processing unit 20 and the second processing unit 40 each combines a comparative signal with a reference signal to form a composite signal that carries LIDAR data for a sample region on the field of view. Accordingly, the composite signal can be processed so as to extract LIDAR data (one or more data selected from the group consisting of one or more reflecting object material indicators, radial velocity between the LIDAR system and an object external to the LIDAR system, and distance between the LIDAR system and the object) for the sample region.

In some instances, a LIDAR chip constructed according to FIG. 1 or FIG. 2 is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the system return signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view. Additionally or alternately, the LIDAR adapter can be configured to operate on the system return signal and the LIDAR output signal such that the second LIDAR input signal and the LIDAR output signal travel on different optical pathways between the LIDAR adapter and the LIDAR chip but on the same optical pathway between the LIDAR adapter and a reflecting object in the field of view.

Figure 3:
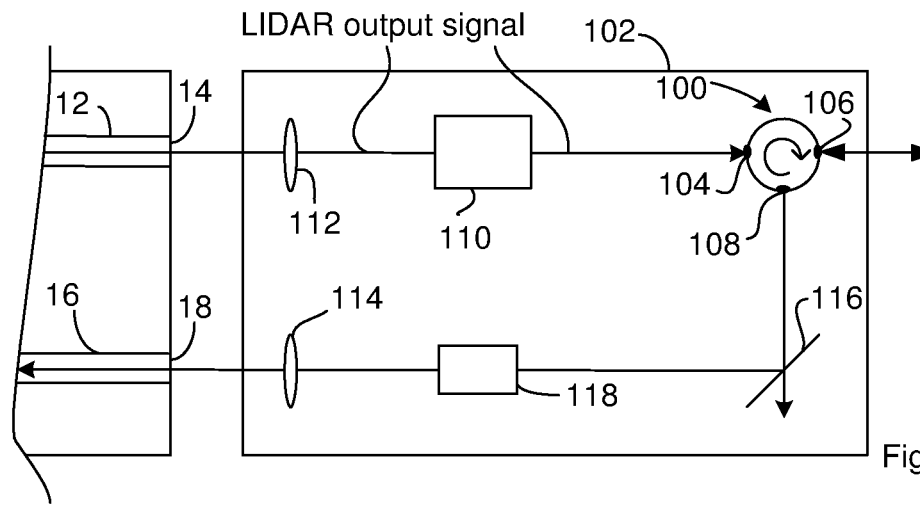
FIG. 3 is a topview of an example of a LIDAR adapter that is suitable for use with the LIDAR chip of FIG. 1.

An example of a LIDAR adapter that is suitable for use with the LIDAR chip of FIG. 1 is illustrated in FIG. 3. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106 as an assembly output signal.

The assembly output signal includes, consists of, or consists essentially of light from the LIDAR output signal received from the LIDAR chip. Accordingly, the assembly output signal may be the same or substantially the same as the LIDAR output signal received from the LIDAR chip. However, there may be differences between the assembly output signal and the LIDAR output signal received from the LIDAR chip. For instance, the LIDAR output signal can experience optical loss as it travels through the LIDAR adapter and/or the LIDAR adapter can optionally include an amplifier 110 configured to amplify the LIDAR output signal as it travels through the LIDAR adapter.

When one or more objects in the sample region reflect light from the assembly output signal, at least a portion of the reflected light travels back to the circulator 100 as an assembly return signal. At least a portion of the light from the assembly return signal enters the circulator 100 through the second port 106. FIG. 3 illustrates the LIDAR output signal and the assembly return signal traveling between the LIDAR adapter and the sample region along the same optical path.

The assembly return signal exits the circulator 100 through the third port 108. The LIDAR adapter includes a polarization splitter 116 that receives the assembly return signal from the circulator 100.

The polarization splitter 116 splits the assembly return signal into a first return signal and a second return signal where the first return signal has a first polarization state but does not have or does not substantially have a second polarization state and the second return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can be linearly polarized such that the LIDAR output signal has the first polarization state. Suitable polarization splitters include, but are not limited to, Wollaston prisms, and MEMs-based polarizing beamsplitters.

The second return signal can be unused or discarded. The first return signal is directed to a polarization rotator 118. The polarization rotator 118 outputs the first LIDAR input signal that is directed to the comparative waveguide 16 on the LIDAR chip. In some instances, the polarization rotator 118 is configured such that the polarization state of the first LIDAR input signal is rotated by m*90° relative to the first return signal where m is an odd integer. As a result, when the first return signal has the first polarization state of TE and the second return signal has the second polarization state of TM, the first LIDAR input signal has the second polarization state of TM. Alternately, when the first return signal has the second polarization state of TM and the second return signal has the first polarization state of TE, the first LIDAR input signal has the first polarization state of TE. The polarization rotator can be reciprocal or reciprocal polarization rotators. Suitable polarization rotators 118 include, but are not limited to rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since there are circumstances where the polarization splitter 116 outputs all or essentially of the assembly return signal as the first return signal, all or a portion of the assembly return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 3, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 3 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 18 of the comparative waveguide 16.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

Figure 4:
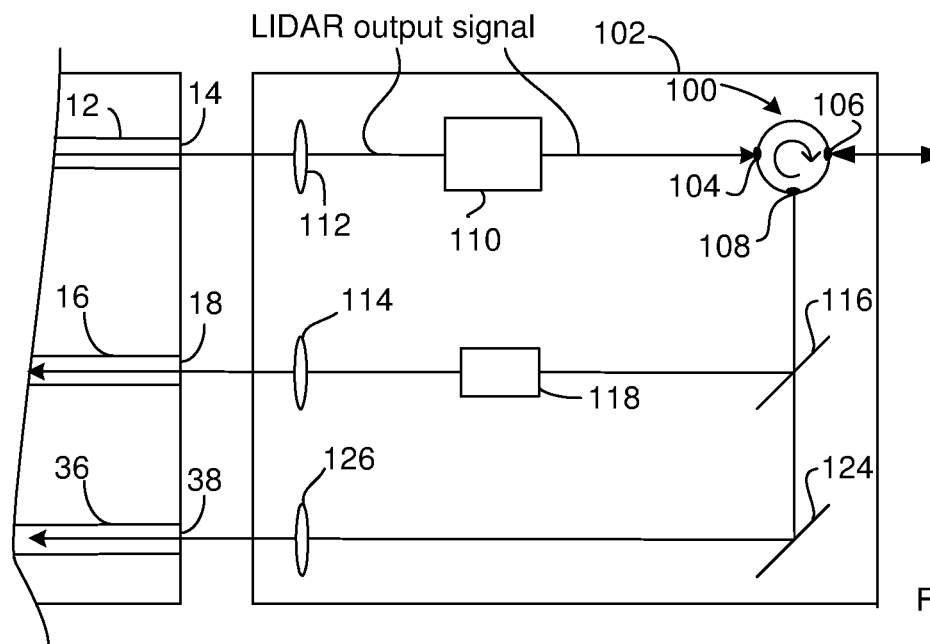
FIG. 4 is a topview of an example of a LIDAR adapter that is suitable for use with the LIDAR chip of FIG. 2.

FIG. 4 illustrates the LIDAR system of FIG. 3 modified such that the LIDAR adapter is suitable for use with the LIDAR chip of FIG. 2. The LIDAR adapter includes a polarization splitter 116 that receives the assembly return signal from the circulator 100. The polarization splitter 116 splits the assembly return signal into a first return signal and a second return signal.

The polarization splitter 116 can be a polarizing beam splitter. One example of a polarizing beamsplitter is constructed such that the first return signal has a first polarization state but does not have or does not substantially have a second polarization state and the second return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can be linearly polarized such that the LIDAR output signal has the first polarization state. Suitable beamsplitters include, but are not limited to, Wollaston prisms, and MEMs-based polarizing beamsplitters.

The first return signal is directed to a polarization rotator 118. The polarization rotator 118 outputs the first LIDAR input signal that is directed to the comparative waveguide 16 on the LIDAR chip. In some instances, the polarization rotator 118 is configured such that the polarization state of the first LIDAR input signal is rotated by m*90° relative to the first return signal where m is an odd integer. As a result, when the first return signal has the first polarization state of TE and the second return signal has the second polarization state of TM, the first LIDAR input signal has the second polarization state of TM. Alternately, when the first return signal has the second polarization state of TM and the second return signal has the first polarization state of TE, the first LIDAR input signal has the first polarization state of TE. Suitable polarization rotators 118 include, but are not limited to rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since there are circumstances where the polarization splitter 116 outputs all or essentially all of the assembly return signal as the first return signal, all or a portion of the assembly return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

The second return signal is directed to the second comparative waveguide 36 on the LIDAR chip and serves as the second LIDAR input signal described in the context of FIG. 2. Since there are circumstances where the polarization splitter 116 outputs all or essentially all of the assembly return signal as the second return signal, all or a portion of the assembly return signal can serve as the second LIDAR input signal and the second LIDAR input signal includes or consists of light from the system return signal. Accordingly, the LIDAR output signal and the second LIDAR input signal travel between the LIDAR adapter and the LIDAR chip along different optical paths.

Accordingly, all or a portion of the assembly return signal can serve as the second LIDAR input signal and the second LIDAR input signal includes or consists of light from the system return signal. Accordingly, the LIDAR output signal and the second LIDAR input signal travel between the LIDAR adapter and the LIDAR chip along different optical paths.

The polarization splitter 116 can be a polarizing beam splitter. One example of a polarizing beamsplitter is constructed such that the first return signal has a first polarization state but does not have or does not substantially have a second polarization state and the second return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first return signal and/or the second return signal. For instance, the polarization rotator 118 shown in FIG. 4 can be configured to change the polarization state of the second return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR input signal carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 4, the first comparative signals, the second comparative signals, the first reference signals, and the second reference signals can each have light of the first polarization state.

As a result of the above configuration, first composite signals generated by the first processing unit 20 and second composite signals generated by the second processing unit 40 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The LIDAR adapter of FIG. 4 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 36 of the second comparative waveguide 38. The LIDAR adapter also includes one or more direction changing components 124 such as mirrors and prisms. FIG. 4 illustrates the LIDAR adapter including a mirror as a direction changing component 124 that redirects the second return signal from the circulator 100 to the facet 38 of the second comparative waveguide 36 and/or to the third lens 126.

The LIDAR chips include one or more waveguides that constrains the optical path of one or more light signals. While the LIDAR adapter can include waveguides, the optical path that the signals travel between components on the LIDAR adapter and/or between the LIDAR chip and a component on the LIDAR adapter can be free space. For instance, the signals can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, the components on the adapter can be discrete optical components that are attached to the base 102.

When the LIDAR system includes a LIDAR chip and a LIDAR adapter, the LIDAR chip, electronics, and the LIDAR adapter can be included in a LIDAR assembly where the LIDAR chip, the LIDAR adapter, and all or a portion of the electronics are positioned on a common mount 128. Suitable common mounts 128 include, but are not limited to, glass plates, metal plates, silicon plates and ceramic plates. As an example, FIG. 5 is a topview of a LIDAR system that includes the LIDAR chip and electronics 32 of FIG. 1 and the LIDAR adapter of FIG. 3 on a common mount 128. As another example, FIG. 6 is a topview of a LIDAR system that includes the LIDAR chip and electronics 32 of FIG. 2 and the LIDAR adapter of FIG. 4 on a common mount 128.

Although FIG. 5 and FIG. 6 illustrate the electronics 32 as located on the common mount 128, all or a portion of the electronics can be located off the common mount 128. When the light source 10 is located off the LIDAR chip, the light source can be located on the common mount 128 or off of the common mount 128. Suitable approaches for mounting the LIDAR chip, electronics, and/or the LIDAR adapter on the common mount 128 include, but are not limited to, epoxy, solder, and mechanical clamping.

The LIDAR systems of FIG. 5 and FIG. 6 can include one or more system components that are at least partially located off the common mount 128. Examples of suitable system components include, but are not limited to, optical links, beam-shaping components, polarization state rotators, beam steering components, optical splitters, optical amplifiers, and optical attenuators. For instance, the LIDAR systems of FIG. 5 and FIG. 6 can include one or more beam-shaping components 130 that receive the assembly output signal from the adapter and output a shaped signal. The one or more beam-shaping components 130 can be configured to provide the shaped signal with the desired shape. For instance, the one or more beam-shaping components 130 can be configured to output a shaped signal that is focused, diverging or collimated. In FIG. 5 and FIG. 6, the one or more beam-shaping components 130 is a lens that is configured to output a collimated shaped signal.

The LIDAR systems of FIG. 5 and FIG. 6 can include one or more polarization rotators 132 that receive the shaped signal and output a rotated signal. In some instances, the one or more polarization rotators 132 are configured to rotate the polarization state of the shaped signal by $n*90°+45°$ where n is 0 or an even integer. Suitable polarization rotators 132 include, but are not limited to, non-reciprocal polarization rotators such as Faraday rotators.

The LIDAR systems of FIG. 5 and FIG. 6 can optionally include one or more beam steering components 134 that receive the rotated signal from the one or more polarization rotators 132 and that output the system output signal. For instance, FIG. 5 and FIG. 6 illustrates a beam steering component 134 that receives the rotated signal from a polarization rotator 132. The electronics can operate the one or more beam steering component 134 so as to steer the system output signal to different sample regions 135. The sample regions can extend away from the LIDAR system to a maximum distance for which the LIDAR system is configured to provide reliable LIDAR data. The sample regions can be stitched together to define the field of view. For instance, the field of view for the LIDAR system includes or consists of the space occupied by the combination of the sample regions.

Suitable beam steering components include, but are not limited to, movable mirrors, MEMS mirrors, optical phased arrays (OPAs), optical gratings, actuated optical gratings and actuators that move the LIDAR chip, LIDAR adapter, and/or common mount 128.

When the system output signal is reflected by an object 136 located outside of the LIDAR system and the LIDAR, at least a portion of the reflected light returns to the LIDAR system as a system return signal. When the LIDAR system includes one or more beam steering components 134, the one or more beam steering components 134 can receive at least a portion of the system return signal from the object 136. The one or more polarization rotators 132 can receive at least a portion of the system return signal from the object 136 or from the one or more beam steering components 134. The one or more polarization rotators 132 can output a rotated return signal. The one or more beam-shaping components 130 receive the rotated return signal from the one or more polarization rotators 132 and output the assembly return signal that is received by the adapter.

When the one or more polarization rotators 132 are configured to rotate the polarization state of the shaped signal by $n*90°+45°$ where n is 0 or an even integer, when the one or more polarization rotators 132 are non-reciprocal, the one or more polarization rotators 132 also rotate the polarization state of the system return signal such that the polarization state of the rotated return signal is rotated by $n*90°-45°$ relative to the polarization state of the system return signal. As a result, the polarization state of the rotated return signal is changed by $n*180°+90°$ (where n is 0 or an even integer) relative to the polarization state of the shaped signal. Accordingly, the polarization state of the assembly return signal is increased by n*180°+90° (where n is 0 or an even integer) relative to the polarization state of the assembly output signal. For instance, when the assembly output signal has a first polarization state of TE, the assembly return signal has the second polarization state of TM. Alternately, when the assembly output signal has the second polarization state of TM, the assembly return signal has the first polarization state of TE.

The LIDAR systems of FIG. 5 and FIG. 6 include an optional optical link 138 that carries optical signals to the one or more system components from the adapter, from the LIDAR chip, and/or from one or more components on the common mount. For instance, the LIDAR systems of FIG. 5 and FIG. 6 include an optical fiber configured to carry the assembly output signal to the beam-shaping components 130. The use of the optical link 138 allows the source of the system output signal to be located remote from the LIDAR chip. Although the illustrated optical link 138 is an optical fiber, other optical links 138 can be used. Suitable optical links 138 include, but are not limited to, free space optical links and waveguides. When the LIDAR system excludes an optical link, the one or more beam-shaping components 130 can receive the assembly output signal directly from the adapter.

Figure 7A:
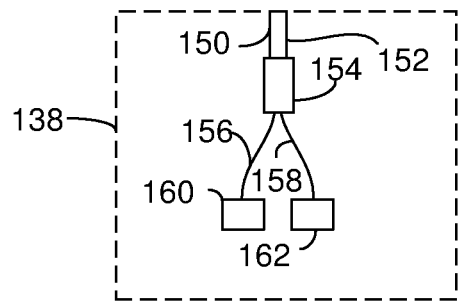
FIG. 7A is a schematic of an example of a suitable processing unit for use in a LIDAR system.
Figure 7B:
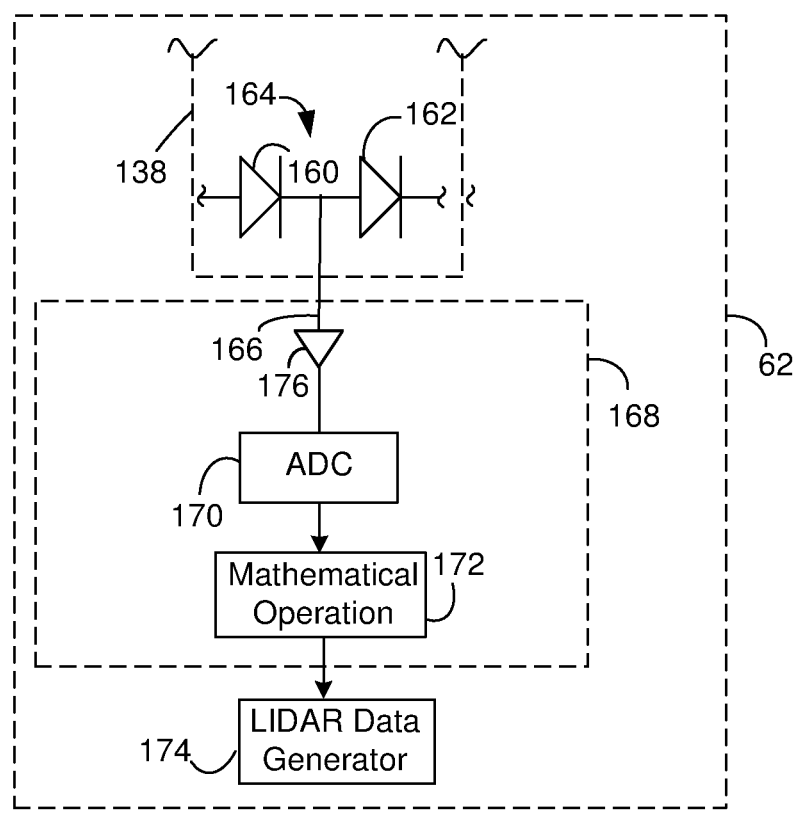
FIG. 7B is a schematic of the relationship between the electronics and the light sensors in a processing unit.

FIG. 7A through FIG. 7B illustrate an example of a processing unit 138 that is suitable for use as the processing unit 20 and/or the processing unit 40 in the above LIDAR systems. The processing unit 138 receives a comparative signal contribution from a comparative waveguide 150 and a reference signal contribution from a reference waveguide 152. The comparative waveguide 150 in FIG. 7A can represent the comparative waveguide 16 of FIG. 1 while the reference waveguide 152 in FIG. 7A is the reference waveguide 24 of FIG. 1. Alternately, the comparative waveguide 150 in FIG. 7A can represent the comparative waveguide 16 of FIG. 2 while the reference waveguide 152 in FIG. 7A is the reference waveguide 24 of FIG. 2. Accordingly, the processing units 138 can receive the first comparative signal as the comparative signal contribution and the first reference signal as the reference signal contribution. Alternately, the comparative waveguide 150 in FIG. 7A can represent the second comparative waveguide 36 of FIG. 2 while the reference waveguide 152 in FIG. 7A represents the second reference waveguide 44 of FIG. 2. Accordingly, the processing units 138 can receive the second comparative signal as the comparative signal contribution and the second reference signal as the reference signal contribution.

The comparative waveguide 150 carries the comparative signal contribution to a light-combining component 154. The reference waveguide 152 carries the reference signal contribution to the light-combining component 154. The light-combining component 154 combines the comparative signal contribution and the reference signal contribution into a composite signal. Due to the difference in frequencies between the comparative signal contribution and the reference signal contribution, the composite signal is beating between the comparative signal contribution and the reference signal contribution.

The light-combining component 154 also splits the resulting composite signal onto a first detector waveguide 156 and a second detector waveguide 158. The first auxiliary detector waveguide 156 carries a first portion of the composite signal to a first light sensor 160 that converts the first portion of the composite signal to a first electrical signal. The second detector waveguide 158 carries a second portion of the composite signal to a second light sensor 162 that converts the second portion of the composite signal to a second electrical signal. Examples of suitable light sensors include germanium photodiodes (PDs), and avalanche photodiodes (APDs).

In some instances, the light-combining component 154 splits the composite signal such that the comparative signal contribution in the first portion of the composite signal is phase shifted by 180° relative to comparative signal contribution in the second portion of the composite signal but the reference signal contribution in the second portion of the composite signal is in-phase with the reference signal contribution in the first portion of the composite signal. Alternately, the light-combining component 154 splits the composite signal such that the reference signal contribution in the first portion of the composite signal is phase shifted by 180° relative to the reference signal contribution in the second portion of the composite signal but the comparative signal contribution in the first portion of the composite signal is in-phase with the portion of the comparative signal in the second portion of the composite signal. Examples of suitable light sensors include germanium photodiodes (PDs), and avalanche photodiodes (APDs).

FIG. 7B provides a schematic of the relationship between the electronics and the light sensors in a processing unit 138. The symbol for a photodiode is used to represent the first light sensor 160 and the second light sensor 162, but one or more of these sensors can have other constructions. In some instances, all of the components illustrated in the schematic of FIG. 7B are included on the LIDAR chip. In some instances, the components illustrated in the schematic of FIG. 7B are distributed between the LIDAR chip and electronics located off of the LIDAR chip.

The electronics 62 can connect the first light sensors 160 and the second light sensors 162 as a balanced detector 164. For instance, the electronics can connect the first light sensors 160 in series with the second light sensor 162 as illustrated in FIG. 7B. The serial connection between the first light sensor 160 and the second light sensors 162 carries the output from the balanced detector as a data signal. The data signal can be carried on a sensor output line 166 and can serve as an electrical representation of the composite signals.

The electronics 62 include a transform mechanism 168 configured to perform a mathematical transform on the data signal. The transform mechanism 168 includes an Analog-to-Digital Converter (ADC) 170 that receives the data signal from the sensor output line 166. The Analog-to-Digital Converter (ADC) 170 converts the data signal from an analog form to a digital form and outputs a digital data signal. The digital data signal is a digital representation of the data signal.

The transform mechanism 168 includes a mathematical operation component 172 configured to receive the digital data signal. The mathematical operation component 172 is configured to perform a mathematical operation on the received digital data signal. Examples of suitable mathematical operations include, but are not limited to, mathematical transforms such as Fourier transforms. In one example, the mathematical operation component 172 performs a Fourier transform on the digital signal so as to convert from the time domain to the frequency domain. The mathematical transform can be a real transform such as a real Fast Fourier Transform (FFT). A real Fast Fourier Transform (FFT) can provide an output that indicates magnitude as a function of frequency. As a result, a peak in the output of the Fast Fourier Transform can occur at and/or indicate the correct solution for the beat frequency of the beating signals. The mathematical operation component 172 can execute the attributed functions using firmware, hardware or software or a combination thereof.

The electronics include a LIDAR data generator 174 that receives the output from the transform component 168. The LIDAR data generator 174 can perform a peak find on the output of the transform component 168 to identify the peak in the frequency of the output of the transform component 168. The LIDAR data generator 174 treats the frequency at the identified peak as the beat frequency of the beating signals that each results from all or a portion of a comparative signal beating against all or a portion of a reference signal. The LIDAR data generator 174 can use the identified beat frequencies in combination with the frequency pattern of the LIDAR output signal and/or the system output signal to generate the LIDAR data.

As shown in FIG. 7B, the sensor output line 166 that carries the data signals can optionally include an amplifier 176. Suitable amplifiers 176 include, but are not limited to, transimpedance amplifiers (TIAs).

Figure 7C:
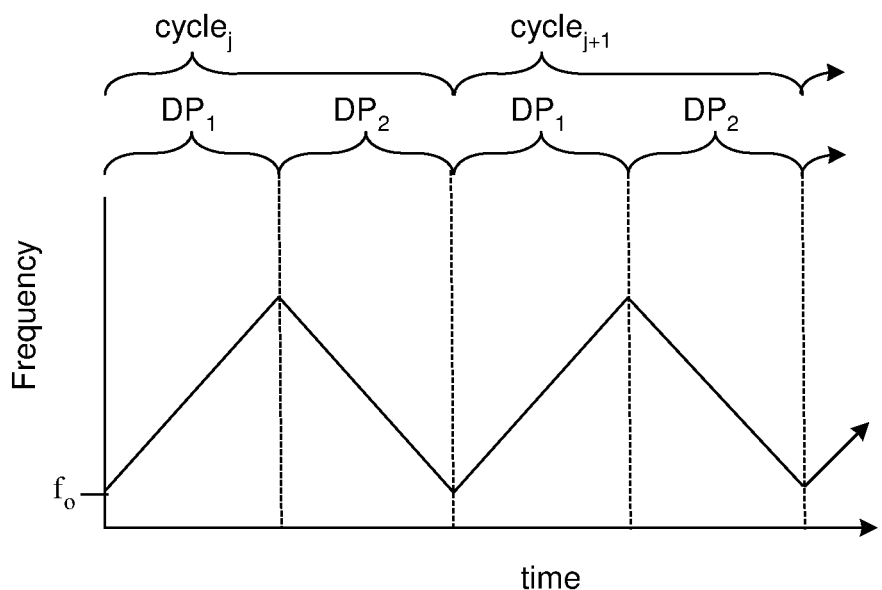
FIG. 7C shows an example of a suitable frequency pattern for the system output signal.

FIG. 7C has a solid line that shows an example of a suitable frequency pattern for the LIDAR output signal and accordingly the system output signal. Accordingly, the solid line also represents the frequency pattern for the reference signal. FIG. 7C shows the frequency versus time pattern over a sequence of two cycles labeled $cycle_j$ and $cycle_{j+1}$. In some instances, the frequency versus time pattern is repeated in each cycle as shown in FIG. 7C. The illustrated cycles do not include re-location periods and/or re-location periods are not located between cycles. As a result, FIG. 7C illustrates the results for a continuous scan of the system output signal to multiple different sample regions in a field of view.

Each cycle includes K data periods that are each associated with a period index k and are labeled $DP_k$. In the example of FIG. 7C, each cycle includes two data periods (with k=1 and 2). In some instances, the frequency versus time pattern is the same for the data periods that correspond to each other in different cycles as is shown in FIG. 7C. Corresponding data periods are data periods with the same period index. As a result, each data period $DP_1$ can be considered corresponding data periods for that same channel index (i) and the associated frequency versus time patterns are the same in FIG. 7C. At the end of a cycle, the electronics return the frequency to the same frequency level at which it started the previous cycle.

During each data period, the frequency of the system output signal is varied at a constant rate. The rate can be zero but at least a portion of the data periods in each cycle have the system output signal varied at a non-zero rate. The direction and/or rate of the frequency change changes at the change of data periods from the same cycle. For instance, during the data period $DP_1$ and the data period $DP_2$, the electronics operate the light source such that the frequency of the system output signal changes at a linear rate α. The direction of the frequency change during the data period $DP_1$ is the opposite of the direction of the frequency change during the data period $DP_2$.

The beat frequencies ($f_{LDP}$) from two or more different data periods in the same cycle can be combined to generate the LIDAR data. For instance, the beat frequency determined from $DP_1$ in FIG. 7C can be combined with the beat frequency determined from $DP_2$ in FIG. 7C to determine the LIDAR data for a sample region. As an example, the following equation applies during a data period where electronics increase the frequency of the outgoing LIDAR signal during the data period such as occurs in data period $DP_1$ of FIG. 7C: $f_{ub}=-f_d+\alpha\tau$ where $f_{ub}$ is the beat frequency determined from the output of the mathematical operation component 172, $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 7C: $f_{db}=-f_d-\alpha\tau$ where $f_{db}$ is the beat frequency determined from the output of the mathematical operation component 172. In these two equations, $f_d$ and τ are unknowns. The electronics solve these two equations for the two unknowns. The radial velocity for the sample region then be determined from the Doppler shift ($v=c*f_d/(2f_c)$) and/or the separation distance for that sample region can be determined from $c*f_d/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

Figure 8A:
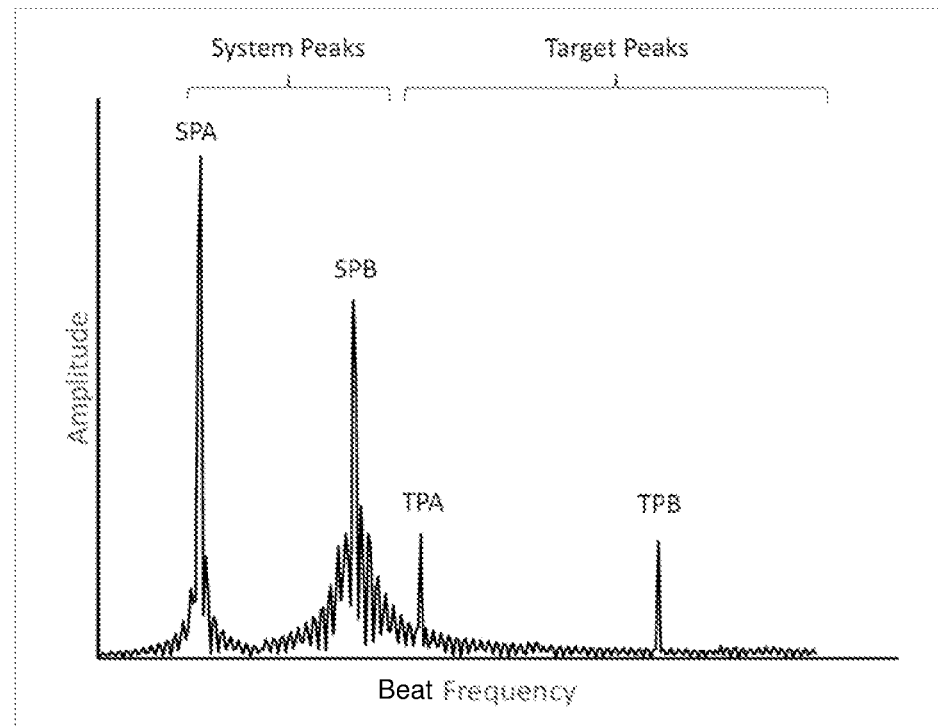
FIG. 8A illustrates an example of the output from a mathematical operation component when misdirected signals are not filtered from LIDAR signals.

FIG. 8A illustrates an example of the output from a mathematical operation component 172 that can occur when the LIDAR system excludes the polarization rotator 118, polarization splitter 116, and the one or more polarization rotators 132. In particular, FIG. 8A illustrates the amplitude versus frequency function that can be output by a mathematical operation component 172 performing a Fourier Transform on a digital data signal in a LIDAR system that excludes the polarization rotator 118 and the one or more polarization rotators 132. The illustrated amplitude versus frequency function includes peaks labeled system peaks and target peaks. Each of the target peaks occur at the beat frequencies associated with reflection of the system output signal by an object located outside of the LIDAR system. In the illustrated example, the sample region includes two different objects that each reflects the system output signal. As a result, each of the target peaks results from a different one of the objects.

The system peaks occur as a result of misdirected light from the outgoing LIDAR signal being included in the composite signal without traveling the LIDAR path that is designed for the signals to travel through the LIDAR system. The light from the outgoing LIDAR signal that does not travel the LIDAR path can be considered a misdirected signal. In some instances, the misdirected signal does not leave the LIDAR assembly or the LIDAR system. Accordingly, light from the misdirected signal is often not included in the system output signal. As a result, light from the misdirected light is often not reflected by an object located in a sample region.

Example sources of a misdirected signal (misdirection sources) include, but are not limited to, reflections, cross talk between optical components in the LIDAR system, and light scattered by component(s) of the LIDAR system. FIG. 8B is the LIDAR system of FIG. 5 marked to show examples of possible undesired reflections of light that can each act as a misdirection source. For instance, FIG. 8B includes a dashed line labeled SPB. The dashed line can represent a reflection of the assembly output signal at the one or more beam-shaping components 130. The reflected signal can travel back through the LIDAR system as if it were light from a properly reflected system return signal. As a result, the reflected signal can be carried to the processing unit 20 and can be included in a comparative signal. The reflected signal can then be the source of the system peak labeled SPB in FIG. 8A.

FIG. 8B also includes an arrow labeled SPA that illustrates a portion of a path for another misdirected signal. The arrow labeled SPA can represent cross talk between the LIDAR output signal and the assembly return signal. The circulator 100 can be the source of this cross-talk. The resulting cross-talk signal can serve as a misdirected signal that travels through the LIDAR system as if it were light from a properly reflected system return signal. As a result, the reflected signal can be carried to the processing unit 20 and can be included in a comparative signal. The misdirected signal can then be the source of the system peak labeled SPA in FIG. 8A.

As is evident from FIG. 8A, the system peaks represent noise in the output of the transform mechanism 168. Additionally, the target peak labeled TPA in FIG. 8A results from an object that is located closer to the LIDAR system than the target peak labeled TPB in FIG. 8B. As a result, the system peaks can reduce the signal-to-noise ratio (SNR) in the output of the transform mechanism 168 for objects that are close to the LIDAR system.

The one or more polarization rotators 132 and the polarization splitter 116 are positioned to increase the signal-to-noise ratio (SNR) in the output of the transform mechanism 168. As is evident from the above discussion, the LIDAR system is designed such that a portion of the light from the light source signal serves as a LIDAR signal that travels on a LIDAR path from the light source to a reflecting object(s) located outside of the LIDAR system and from the reflecting object(s) to the polarization splitter 116, and from the polarization splitter 116 to the processing unit 20. The LIDAR path can include the utility waveguide 12, the comparative waveguide, and paths traveled by signals such as the LIDAR output signal, the assembly output signal, the system output signal, the system return signal, the assembly return signal and the LIDAR input signal.

Additionally, one or more misdirected portions of the light from the light source signal can each serve as a misdirected signal. The misdirected light signals can each travel on a different misdirected path that extends from the light source to one of the misdirection sources and then to the polarization splitter 116. As is evident from the labels SPA and SPB in FIG. 8B, the misdirection sources are each a feature of the LIDAR path where one of the misdirection signals that is traveling along the LIDAR path is diverted from traveling the full length of the LIDAR path. In some instances, the LIDAR system is constructed such at least one of the misdirected signals is reflected by a surface through which the LIDAR signal is transmitted such as illustrated by the arrow labeled SPB in FIG. 8B and/or at least one of the misdirected signals carries cross-talk between different components in the LIDAR system as illustrated by the arrow labeled APS in FIG. 8B.

Optical signals described in the context of FIG. 1 through FIG. 6 can have contributions from different portions of the LIDAR signal and the one or more misdirected signals. For instances, the outgoing LIDAR signal can carry a contribution from the LIDAR signal and also contributions from one or more of the misdirected signals. Similarly, the assembly return signal can have a contribution from the LIDAR signal and also contributions from one or more of the misdirected signals.

The one or more polarization rotators 132 are positioned along the comparative signal path after one or more of the sources of misdirected light. As a result, the LIDAR signal encounters the one or more misdirection sources before encountering the one or more polarization rotators 132. In contrast, the misdirected signal(s) do not encounter the one or more polarization rotators 132 as a result of being misdirected by one of the misdirection sources.

Although the above LIDAR systems illustrate the LIDAR signal being received by the one or more polarization rotators 132 multiple times, the LIDAR system can be configured such that the comparative portion of light is received by the one or more polarization rotators 132 a single time. For instance, the one or more beam steering components 134 can be configured such that the system return signal is directed to the one or more beam-shaping components 130 without being received by the one or more polarization rotators 132. As a result, the one or more polarization rotators 132 can be configured to change the polarization state of the LIDAR signal one or more times.

The portion of the LIDAR signal that travels from the last of the one or more polarization rotators 132 to receive the LIDAR signal to the polarization splitter 116 can serve as a rotated LIDAR signal. Accordingly, the polarization splitter 116 receives the rotated LIDAR signal. The portion of the misdirected signal that travels from a misdirection sources to the polarization splitter 116 can serve as a noise signal. Accordingly, the polarization splitter 116 receives the noise signal.

The one or more polarization rotators 132 are selected such that the rotated LIDAR signal has a different polarization state than the noise signal. The polarization splitter 116 uses the difference in polarization states to separate the rotated sample and the noise signal. As shown in FIG. 8B, the rotated LIDAR signal is passed on to the processing unit 20 while the noise signal can be unused or discarded.

In the above LIDAR systems, the polarization rotator 118 receives the rotated LIDAR signal from the polarization splitter 116. The polarization rotator 118 can be selected such that the portion of comparative signal and the portion of the reference signal that are combined to form the composite signal have the same polarization state. For instance, the polarization rotator 118 can be selected to further rotate the rotated LIDAR signal such that the comparative signal and the reference signal have the same polarization state when received by the processing unit 20.

An example of the possible polarization states are illustrated in FIG. 8B. In FIG. 8B, each of the arrows showing a signal traveling in a single direction are labeled with the polarization state that is primarily carried by that signal. In FIG. 8B, the arrows that show signals traveling in multiple directions are accompanied by arrows showing the polarization state that is primarily carried by the signal traveling in the illustrated direction. In some instance, the polarization state that is primarily carried by a signal is the only polarization state carried by the signal.

Light from a laser is typically linearly polarized. As a result, the outgoing LIDAR signal is also typically linearly polarized. As a result, in the example of FIG. 8B, the light source 10 outputs a light source signal with a first polarization state of TE although the light source can output a light source signal with a polarization state of TM. The LIDAR signal passes through the polarization rotator 132 twice and the sum of those rotations changes the polarization state of the LIDAR signal from TE to TM.

Since this rotation of the polarization states of the LIDAR signal occurs after the misdirection sources (SPA and SPB), the polarization splitter 116 receives the LIDAR signal in a different polarization state (TM) from the noise signals (misdirected signals both in TE). As a result, the polarization splitter 116 acts as a filter that filters the noises signals (misdirected signals) from the LIDAR signal that is used to generate the LIDAR data. Additionally, the polarization rotator 118 changes the polarization state of the LIDAR signal to match the polarization state of the reference signal (TE).

Figure 8C:
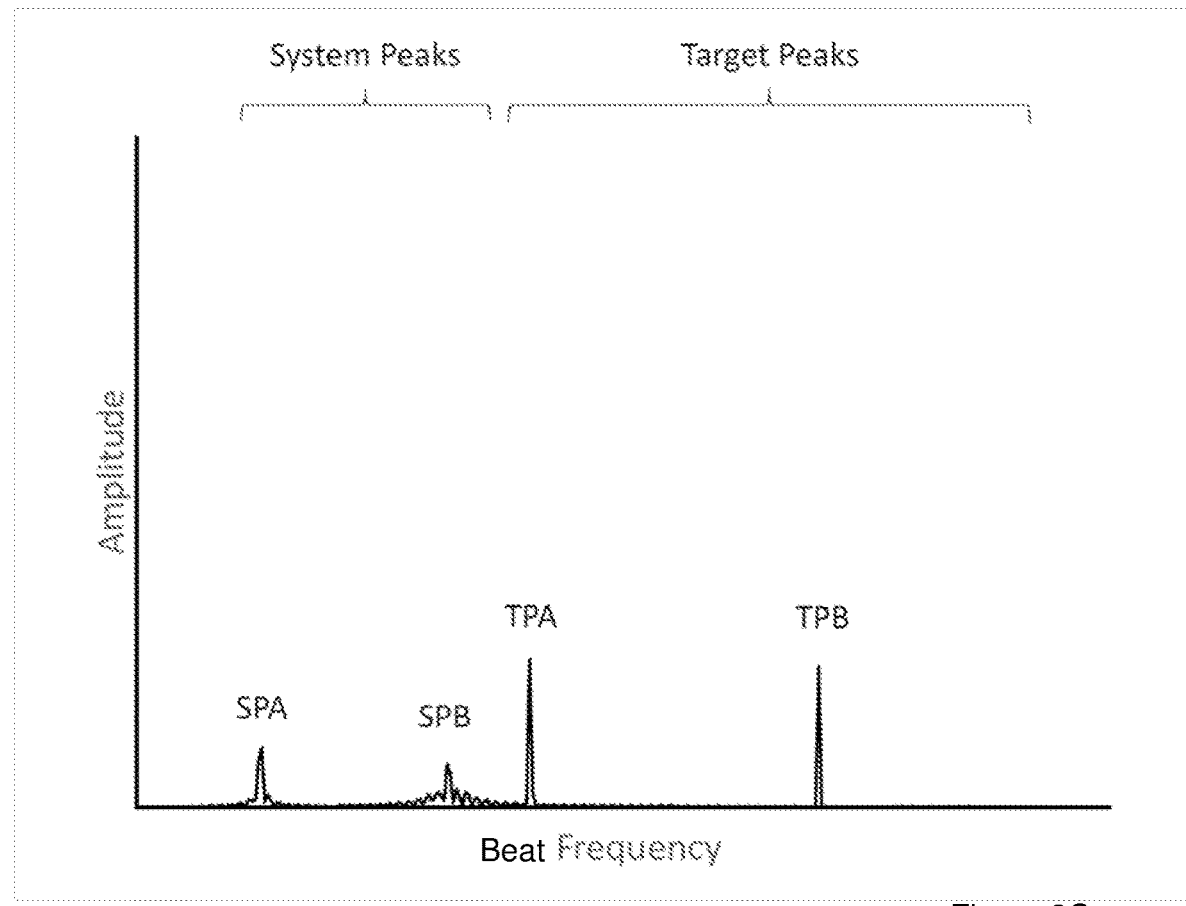
FIG. 8C illustrates an example of the output from a mathematical operation component when misdirected signals are filtered from LIDAR signals.

FIG. 8C illustrates the output from the mathematical operation component 172 when the LIDAR system includes the polarization rotator 118, polarization splitter 116, and the one or more polarization rotators 132. As a result, FIG. 8C illustrates the output from the mathematical operation component 172 when all or a portion of the misdirected signals are filtered from the LIDAR signal. As is evident from FIG. 8A, the system peaks can have a higher amplitude than the target peaks. As a result, since amplitude is proportionately related to signal power, the misdirected signals can each have a higher power than the LIDAR signal. This can be a result of the misdirected signals staying within the LIDAR system while the LIDAR signal leaves the LIDAR system and is returned to the LIDAR system as a result diffuse reflection by the object. FIG. 8C shows that the filtering of the misdirected signals from the LIDAR signals can reduce the amplitude of the misdirected signals below the amplitude of the LIDAR signals. As a result, the filtering can reduce the power of the misdirected signals below the power of the LIDAR signal. FIG. 8C still shows some amplitude from the system peaks because misdirection sources such as reflections can also change the polarization state of a portion of the misdirection signal. This change in the polarization state allows a portion of the misdirection signal to reach the processing unit.

The LIDAR system in FIG. 6 includes a second processing unit 40. The second processing unit 40 receives the noise signal portion of the misdirected signal described as being unused or discarded in the context of FIG. 8B. However, the second processing unit 40 can also receive a portion of the LIDAR signal. For instance, reflection of the system output signal by an object may change the angle of polarization of all a portion of the system return signal. Accordingly, the LIDAR signal can carry light of different polarization states away from the reflecting object. For instance, a first portion of the LIDAR signal and a second portion of the LIDAR signal can include light in different polarization states. As a result, the polarization splitter 116 can divide the LIDAR signal into the first portion of the LIDAR signal and the first portion of the LIDAR signal. The first portion of the LIDAR signal is directed to the first processing unit 20 and the second portion of the LIDAR signal is directed to the second processing unit 40. As a result, the second processing unit 40 can receive a portion of the LIDAR signal and can also receive the noise signal. In contrast, the processing unit 20 receives a portion of the LIDAR signal but does not receive the noise signal or receives levels of the noise signal that are lower than the levels received by the second processing unit 40. In some instances, the power of the noise signal received by the second processing unit 40 is more than 5, 10, or 100 times the power of the noise signal received by the processing unit 20.

The portion of the LIDAR signal received by the first processing unit 20 can serve as the first comparative signal and the portion of the LIDAR signal received by the second processing unit 40 can serve as the second comparative signal. The electronics 62 can use the output from the second processing unit 40 to generate LIDAR data. As a result, the electronics can generate a first LIDAR data results from the output of the first processing unit 20 and second LIDAR data results from the output of the second processing unit 40. As a result, the FIG. 6 LIDAR system configuration can result in the LIDAR data for a single sample region in the field of view being generated from multiple different composite signals (i.e. first composite signals and the second composite signal) from the sample region.

In some instances, determining the LIDAR data for the sample region includes the electronics combining the LIDAR data results from different composite signals (i.e. the composite signal and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Figure 9:
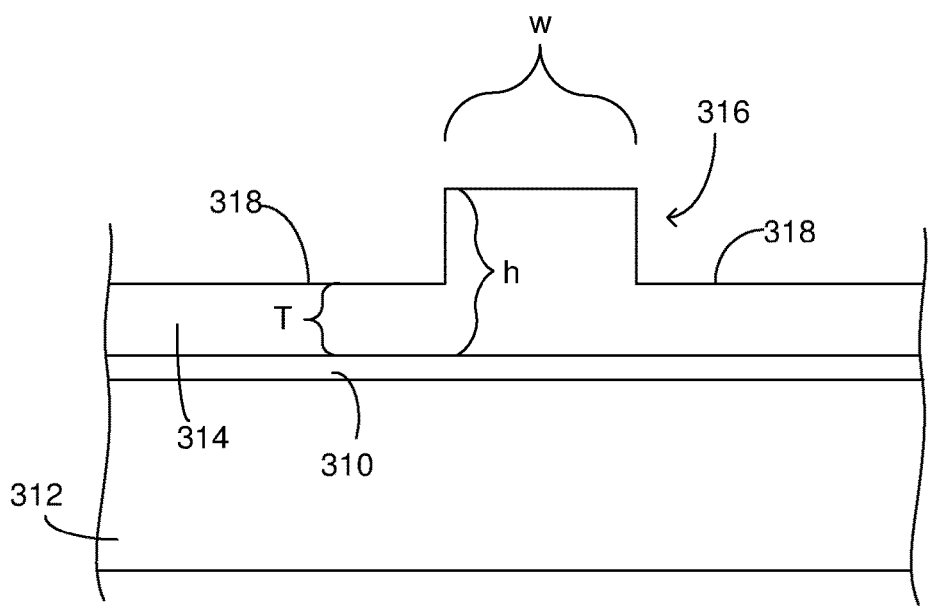
FIG. 9 is a cross-section of a portion of a LIDAR chip that includes a waveguide on a silicon-on-insulator platform.

Suitable platforms for the LIDAR chips include, but are not limited to, silica, indium phosphide, and silicon-on-insulator wafers. FIG. 9 is a cross-section of portion of a chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the LIDAR chips of FIG. 1 through FIG. 2 can be positioned on or over the top and/or lateral sides of the substrate 312.

FIG. 9 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 9. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 9 is suitable for all or a portion of the waveguides on LIDAR chips constructed according to FIG. 1 through FIG. 2.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the first light sensor and the second light sensor.

The light source 10 that is interfaced with the utility waveguide 12 can be a laser chip that is separate from the LIDAR chip and then attached to the LIDAR chip. For instance, the light source 10 can be a laser chip that is attached to the chip using a flip-chip arrangement. Use of flip-chip arrangements is suitable when the light source 10 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 10 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. When the light source 10 is a gain element or laser chip, the electronics can change the frequency of the outgoing LIDAR signal by changing the level of electrical current applied to through the gain element or laser cavity.

Suitable electronics can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the light source 10 is illustrated as being located on the LIDAR chip, the light source can be located off the LIDAR chip. For instance, the LIDAR chip can receive the outgoing LIDAR signal from an optical fiber.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a light source configured to output light;
a portion of the light included in a LIDAR signal that travels a LIDAR path from the light source to an object, from the object to a filter, and from the filter to a processing unit,
the object being located outside of the LIDAR system,
the processing unit being configured to convert optical signals to electrical signals, the optical signals including the LIDAR signal;
a portion of the light being included in one or more misdirected signals, each of the misdirected signals traveling a different misdirected path from the light source to the filter, each of the misdirected paths being different from a portion of the LIDAR path from the light source to the object and from the object to the filter;

the filter being configured to filter the LIDAR signal from the misdirected signals; and electronics that generate LIDAR data from the electrical signals.

2. The system of claim 1, wherein the filter is configured to split light signals into different output signals such that different output signals have different polarization states.

3. The system of claim 1, wherein the LIDAR signal primarily carries light in a first polarization state and the one or more misdirected signals each carries light that is primarily in a second polarization state, the filter receiving the LIDAR signal and the one or more misdirected signals, and the filter being configured to split the LIDAR signal and the one or more misdirected signals into different output signals such that one of the output signals carries light of the first polarization state and a second one of the output signals carries light of the second polarization state.

4. The system of claim 1, wherein the filter is a Wollaston prism.

5. The system of claim 1, wherein the LIDAR system includes a LIDAR chip and the LIDAR chip includes one or more waveguides that define a portion of the optical path and at least a portion of the one or more misdirected paths.

6. The system of claim 1, wherein the misdirected paths do not extend outside of the LIDAR system.

7. The system of claim 1, wherein the LIDAR system includes a surface at which at least one of the misdirected signals is reflected but through which the LIDAR signal is transmitted.

8. The system of claim 1, wherein a misdirected path of at least one of the misdirected signals includes cross talk between different components in the LIDAR system.

9. The system of claim 1, wherein the LIDAR path includes a polarization rotator configured to change a polarization state of the LIDAR signal before the LIDAR signal is received by the filter.

10. The system of claim 9, wherein the polarization rotator is located on the LIDAR path after one or more misdirection sources, each misdirection source being a feature of the LIDAR path where one of the misdirection signals traveling on the LIDAR path is diverted from traveling a full length of the LIDAR path.

11. The system of claim 9, wherein each of the misdirection paths extends from the light source to one of the misdirection sources and from the misdirection source to the filter.

12. The system of claim 11, wherein at least a portion of the misdirection sources are selected from a group consisting of a surface at which reflection occurs and components between which cross-talk occurs.

13. The system of claim 9, wherein the polarization rotator is configured to receive the LIDAR signal and to output the LIDAR signal with a polarization state changed by 45° relative to the polarization state of the LIDAR signal when the LIDAR signal was received by the polarization rotator.

14. The system of claim 13, wherein the polarization rotator is a non-reciprocal polarization rotator configured such that the polarization rotator receives the LIDAR signal twice.

15. The system of claim 14, wherein the polarization rotator receives the LIDAR signal before the LIDAR signal is reflected by the object and after the LIDAR signal is reflected by the object.

16. The system of claim 9, wherein a second polarization rotator is configured to change a polarization state of the LIDAR signal after the LIDAR signal is received by the filter.

17. The system of claim 16, wherein a polarization state of the reference signal at the time the reference signal is received at the processing unit matches a polarization state of the LIDAR signal at the time the LIDAR signal is received at the processing unit.

18. The system of claim 17, wherein a second polarization rotator is configured to change a polarization state of the LIDAR signal after the LIDAR signal is received by the filter.

19. The system of claim 9, wherein the processing unit receives a reference signal in addition to receiving the LIDAR signal.

20. The system of claim 1, wherein the processing unit receives a reference signal in addition to receiving the LIDAR signal, the reference signal including light from the light source.

* * * * *